US006316515B1

(12) United States Patent
Lake

(10) Patent No.: US 6,316,515 B1
(45) Date of Patent: Nov. 13, 2001

(54) UV CURABLE HARDCOAT COMPOSITIONS AND PROCESSES

(75) Inventor: Randall Todd Lake, Newburgh, IN (US)

(73) Assignee: Red Spot Paint & Varnish Co., Inc., Evansville, IN (US)

( * ) Notice: Subject to any disclaimer, the term of this patent is extended or adjusted under 35 U.S.C. 154(b) by 0 days.

(21) Appl. No.: 08/482,039

(22) Filed: Jun. 7, 1995

Related U.S. Application Data

(62) Division of application No. 08/223,124, filed on Apr. 5, 1994, now abandoned.

(51) Int. Cl.[7] ................. C08J 3/28; C08J 7/04; B32B 27/16; B32B 27/40
(52) U.S. Cl. ................. 522/75; 522/78; 522/79; 522/96; 522/173; 428/412; 428/423.1; 428/423.7; 428/424.2; 428/424.4; 428/424.6; 428/424.7; 428/424.8
(58) Field of Search ................. 522/96, 74, 75, 522/78, 79, 173; 359/581; 428/412, 423.1, 423.7, 424.2–424.8; 427/517, 519

(56) References Cited

U.S. PATENT DOCUMENTS

| | | | |
|---|---|---|---|
| 4,393,187 | * 7/1983 | Boba et al. | 528/60 |
| 4,511,596 | * 4/1985 | Berner | 427/44 |
| 4,929,506 | 5/1990 | Kerr, III et al. | 428/412 |
| 5,015,524 | * 5/1991 | Kobayashi et al. | 428/332 |
| 5,049,321 | 9/1991 | Galic . | |
| 5,410,006 | * 4/1995 | Tchibana et al. | 526/292.6 |
| 5,459,176 | * 10/1995 | Bae et al. . | |
| 5,496,641 | * 3/1996 | Mase et al. . | |
| 5,514,522 | * 5/1996 | Fitzgerald et al. | 430/284.1 |
| 5,518,789 | * 5/1996 | Burns et al. | 428/65.5 |
| 5,571,570 | * 11/1996 | Lake | 427/494 |

FOREIGN PATENT DOCUMENTS 0 135 925-A2 * 4/1985 (EP) .

OTHER PUBLICATIONS

Material Safety Data Sheet; Reg Ebecryl 8301, Aug. 7, 1990.
Material Safety Data Sheet; Experimental Product RSX 85289, Jun. 1, 1989.
Material Safety Data Sheet; PETA, Jun. 1, 1990.
Material Safety Data Sheet; Reg Ebecryl 1290, Feb. 9, 1990.
Ebecryl Pamphlet from Chemical Sector, Jan. 1988.
RadTech '90–North America Proceedings, vol. 1, Mar. 25–29, 1990.
Mahon, W.F. and Nason, D.L., "UV Cure Finishing Systems for Wood", UCB Radcure Inc., RadTech '92–North America Proceedings, vol. 1., 1992.
Cauffman, T.E., "The Influence of Urethane Acrylate Molecular Weight and Structure on Accelerated Weathering", Sartomer Company Exton, PA., 1993.
Miller, H.C., "Acrylourethane Resin Design", Radiation Curing, May 1994, pp. 4–9.
McConnel, J.A. et al., "Structure–Performance Relationships of Urethane Acrylates", Radiation Curing of Polymeric Mtls., Chapter 20, pp. 272–283 (1990).

* cited by examiner

Primary Examiner—Susan W. Berman
(74) Attorney, Agent, or Firm—Woodard, Emhardt, Naughton Moriarty & McNett

(57) ABSTRACT

Described is a preferred UV curable coating composition comprising (exclusive of any solvent present): (a) about 5% to 90% by weight of an acrylated aliphatic urethane having a molecular weight of about 500 to 2000 and comprising an aliphatic urethane based on a polymer of allyl carbomonocycle diisocyanate with alkanepolyol polyacrylates, (b) about 5% to 30% by weight of a multifunctional acrylate having a molecular weight of about 170 to 1000 and containing at least two polymerizable unsaturated groups per molecule; and (c) a photopolymerization initiator and/or sensitizer. Also described are preferred processes of coating a plastic and coated articles involving the preferred coating compositions.

5 Claims, No Drawings

UV CURABLE HARDCOAT COMPOSITIONS AND PROCESSES

This application is a division of application Ser. No. 08/223,124, filed Apr. 5, 1994 now abandoned.

BACKGROUND OF THE INVENTION

The present invention relates generally to ultraviolet (UV) cured coatings, and more particularly to UV curable coating compositions, processes of their use, and as well to coated articles resulting therefrom.

Conventionally cured hardcoat finishes have several disadvantages. In general, the coating materials and the curing agent must be applied separately, in a particular sequence and at particular relative levels. Because both the proportions of the ingredients and the timing of their application is critical, conventionally cured hardcoats have been difficult and costly to apply, especially with the consistency and uniformity required in current commercial applications.

UV cured coatings overcome several disadvantages associated with conventional hardcoat finishes. In particular, UV curable coating compositions may be premixed, e.g. the polymerization initiator is added to the active ingredients by the manufacturer when the coating is produced, and not by the coating user when the coating is about to be applied. Thus, mixing and measurement errors can be avoided and a more consistent product can be obtained.

Despite their many advantages, UV curable coating compositions themselves pose problems which must be addressed. For example, typical UV hardcoats are high molecular weight, highly crosslinked films which are formed from the highly reactive acrylate functionality. As such, known UV hardcoats have suffered from limited durability, low solids content and cured resin shrinkage. They have also required high doses of UV light to cure. Other UV hardcoats formulated in an attempt to overcome these problems typically suffer from some combination of loss of abrasion and scratch resistance, poor processibility and unsatisfactory durability. A need therefore exists for a UV curable product which is conveniently processable and which forms cured coatings exhibiting improved physical and chemical properties, e.g. scratch and abrasion resistance, and durability.

SUMMARY OF THE INVENTION

The applicant's invention now addresses these needs and provides in one preferred embodiment a scratch resistant UV curable coating composition. This compositions comprises: (a) 5% to 90% by weight of an acrylated aliphatic urethane having a molecular weight of between about 500 and 2000 and formed by the reaction of (i) a multifunctional acrylate with a molecular weight of between about 190 and 500 and containing at least three polymerizable unsaturated groups per molecule, with (ii) an aliphatic urethane based on a polymer of alkyl carbomonocycle diisocyanate with alkanepolyol polyacrylates; (b) 5% to 30% by weight of a multifunctional acrylate having a molecular weight of between about 170 and 1000 and containing at least two polymerizable unsaturated groups per molecule; and (c) a photopolymerization initiator and/or photopolymerization sensitizer. The composition can also optionally include a solvent. However, unless otherwise specified, percents by weight set forth in this application are calculated exclusive of any solvent present. More preferred compositions can also include suitable light stabilizing agents, e.g. hindered amine and/or benzotriazole derivatives, and also antioxidant materials.

Additional preferred embodiments of the invention relate to coated articles and coating processes resulting from and involving the use of applicant's preferred coating compositions.

One object of the invention is to provide improved ultraviolet curable coating compositions giving coatings and coated articles demonstrating superior chemical and physical properties such as chemical resistance, weather resistance, abrasion resistance, scratch resistance, stain resistance, heat resistance and adhesion.

Another object of the invention is to provide processes for coating articles, e.g. plastic articles, exhibiting improved physical and chemical properties.

Still another object of the present invention is to provide a coated article exhibiting superior physical and chemical properties.

Another object of this invention is to provide coating processes and compositions which enable convenient and consistent, uniform processibility.

Further objects and advantages of the present invention will be apparent from the following description and appended claims.

DESCRIPTION OF PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, such alterations and further modifications and applications of the principles of the invention as described herein being contemplated as would normally occur to one skilled in the art to which the invention relates.

As indicated above, one preferred embodiment of this invention relates to a UV curable coating composition. In this regard, Formula I, set forth below, shows starting materials and compositional ranges for preferred coating compositions of the invention. The compositional ranges are given as percent by weight of the composition excluding any solvent which is included.

| Formula I: | |
|---|---|
| Acrylated aliphatic urethane | (5–90%) |
| Multifunctional acrylate | (5–30%) |
| Photopolymerization initiator/sensitizer | (3–15%) |
| Hindered amine light stabilizer | (0.1–7.5%) |
| Benzotriazole | (0.1–7.5%) |
| Antioxidant | (0.1–3.0) |
| Flow additive | (0.1–5.0%) |

The acrylated aliphatic urethanes according to the invention contain about 5% to about 95% by weight of prereacted multifunctional acrylate and the balance in the aliphatic urethane. More particularly, to obtain the acrylated aliphatic urethanes, a multifunctional acrylate having a molecular weight of about 190 to about 500 and containing at least 3 polymerizable unsaturated groups per molecule (e.g., pentaerythritol triacrylate, diphenyl erythritol tetraacrylate, and trimethylolpropane triacrylate) is prereacted with an aliphatic urethane based on a polymer of alkyl carbomonocycle diisocyanate with alkanepolyol polyacrylates. The acrylate having at least three polymerizable groups provides an acrylated aliphatic urethane giving final coatings demonstrating good surface hardness, for example as evidenced by steel wool scratch resistance.

The preferred acrylated aliphatic urethane has a final number average molecular weight of about 500 to about 2000. More preferably, the acrylated aliphatic urethane has a number average molecular weight of about 800 to about 1000, with those having a number average molecular weight of about 800 being most preferred in work to date. These preferred acrylated aliphatic urethanes provide coatings of good weather and thermal crack resistance. Further, these acrylated aliphatic urethanes provide advantageous application solids, curing rates and material compatibility.

The acrylated aliphatic urethane may be obtained commercially. For example, EBECRYL 8301 (a mixture of greater than 50% polymer of alkylcarbomonocyclic diisocyanate with alkanepolyolpolyacrylates and less than 50% acrylated polyol), available from Radcure Specialties, Inc. of Atlanta, Ga. has been highly preferred in work to date.

Exclusive of any solvent present, as indicated above, the acrylated aliphatic urethane constitutes about 5% to 90% by weight of the coating composition. More preferably, this acrylated aliphatic urethane makes up about 50% to about 90% of the composition, most preferably about 90%. These preferred levels have provided good weather and thermal crack resistance, as well as advantageous viscosity, material capacity and cure rates.

As will be understood, the particular multifunctional acrylate employed will depend upon the desired application viscosity and other properties. The preferred multifunctional acrylates are of the reactive diluent type, have a molecular weight of about 170 to about 1000, and contain at least two polymerizable unsaturated groups per molecule. Representative multifunctional acrylates thus include ethylene glycol di(meth)acrylate, 1, 6-hexanediol diacrylate, pentaerythritol triacrylate., pentaerythritol tetra acrylate, trimethylolpropane triacrylate, tetraethleneglycol diacrylate, and the like, and mixtures thereof, with light-stable materials, e.g. 1, 6-hexanediol diacrylate, being more preferred.

The preferred coating composition includes the multifunctional acrylate in an amount of about 5% to about 30% by weight, with the range of about 10% to about 20% being more preferred. These preferred levels provide compositions of good compatibility which give coatings of excellent thermal crack resistance.

As those practice in these areas will appreciate, many photopolymerization initiators will be suitable for the invention. These include, for instance, benzophenone, benzion, benzionmethyl ether, benzion-n-butyl ether, benzion-isobutyl ether, propiophenone, acetophenone, methyphenylgloxylate, 1-hydroxycyclohexyl phenyl ketone, 2, 2-diethoxyacetophenone, ethlphenylpyloxylate, phenanthraquinone, and the like, and mixtures thereof. In work thus far, 1-hydroxycyclohexyl phenyl ketone has been more preferred.

The photopolymerization initiator and/or sensitizer will be included in an amount sufficient to obtain the desired cure response. In preferred compositions of the invention, the photopolymerization initiator or sensitizer is included in amounts of about 3% to about 15% by weight. The range of about 5% to about 8.5% is more preferred, with about 6% being most preferred so far. As indicated, however, the amount of initiator and/or sensitizer included will vary based upon many factors such as the cure rate and level of scratch resistance desired. For additional information as to photopolymerization initiators and sensitizers, reference can be made to C. G. Roffey, *Photopolymerization of Surface Coatings*, Chapter 3: "Photo-initiators and photo-sensitizers", John Wiley & Sons Ltd (1982), which is hereby incorporated by reference.

The coating composition also preferably includes other materials such as light stabilizers, e.g. suitable hindered amines and/or benzotriazole derivatives, as well as antioxidants. These materials will be included in varying amounts in accordance with the particular use or application desired. When included, their amounts will be sufficient to provide increased weatherability yet still obtain adequate cure response for the composition. In more preferred compositions, hindered amine, benzotriazole, and antioxidant have been included in amounts of about 1–6%, 0.5–2.5%, and 0.25–1.5%, respectfully, and in particularly preferred compositions about 0.7%, 0.5% and 0.5% by weight, respectively.

As stated, the coating composition also optionally includes a suitable inert solvent. Representative such solvents include ester solvents, e.g. ethyl acetate, butyl acetate, and the like, ketone solvents, e.g. acetone, methylisobutylketone, methylethylketone, and the like, alcohols, e.g. butyl alcohol, and the like, and aromatic solvents, e.g. toluene, xylene, and the like. The amount of solvent included will vary in accordance with the particular application at hand. For instance, for spray applications, higher levels of solvent will typically be included, while for roll applications, lower levels of inert solvent, if any, will be employed. In any event, the inert solvent will constitute from 0% to about 95% by weight of the coating composition, and in more preferred coating compositions about 40% to 60%.

As will be understood, the coating composition can also include other conventional additives. For instance, it can contain polymeric or silicone coating surface improvers, flow improvers, dyes, pigments, flatting agents (e.g. wax-coated or non-wax-coated silica or other inorganic materials), etc. In more preferred compositions, flow improver is included at a level of about 0.3–2%, and in one especially preferred composition, the flow improver BYK 301, available from BYK-CHEMIE, of Wallingford, Conn., has been included.

As to its use, the coating composition can be applied by any conventional coating method as known in the art. For example the composition can be applied directly to the substrate or over another previously-cured (e.g. paints or primers) or uncured (e.g. in the case of tie coats) coating. The topcoat material is advantageously used at about 0.3 mils to about 3.0 mils of cured film thickness, with more preferred cured film thicknesses being those around about 1 mil.

Once applied, the coating composition can be cured by irradiation with ultraviolet rays as is known to those skilled in the art. In this regard, the irradiation is continued until curing is complete, with preferred exposure times typically being less than 300 seconds. Curing temperatures can range from room temperature to the heat distortion temperature of the substrate, while curing distances are typically between about 2 and 18 inches from the UV source.

An ultraviolet light source having a wavelength range of between about 1800 Angstroms and 4500 Angstroms is preferred for curing the topcoat. For example, sunlight, mercury lamps, arc lamps, zenon lamps, gallium lamps, and the like may be used, but high pressure or ultrahigh pressure mercury lamps with power outputs of between about 30 W/cm and 400 W/cm provide particularly advantageous rapid cures.

A high pressure mercury lamp having an intensity of about 30 W/cm to 400 W/cm is preferred, for a total exposure of between about 300 and 16000 mJ/cm$^2$ as measured by a compact radiometer at 60 to 1200 mW/cm$^2$ and about 75 to 4000 mJ as measured by a UVIMAP, with a preferred exposure of about 3000 mJ/cm$^2$ as measured by a compact radiometer at 260 mW/cm$^2$ and about 700 mJ as measured by a UVIMAP. These preferred curing processes have provided good through cure, and have ensured advantageous coatings which resist premature yellowing and demonstrate desirable thermal crack resistance. Moreover, these advantageous cures have been achieved over a surprisingly wide range of exposures. Accordingly, the preferred compositions are readily and highly conveniently processable. Previously known UV curable compositions have demonstrated serious deficiencies in this regard, a problem long recognized in the industry leading to increased production costs and wastes of time and materials.

For the purposes of promoting a further understanding of the invention and its preferred features and advantages, reference will now be made to the following specific examples and tables. It will be understood that these examples and tables are given by way of illustration and are not restrictive of the invention.

EXAMPLE 1

Preparation of Preferred UV Curable Coating Composition

In order to prepare a UV curable coating composition in accordance with the invention, items 1 and 2 of Formula II below were charged into a clean stainless steel vessel equipped with a stirrer. Thereafter, ingredients 3 through 9 were added under agitation until a clear homogeneous mixture was obtained. This composition was designated "Topcoat A".

| FORMULA II | |
|---|---|
| | Part by weight |
| 1. Isopropanol | 588.1 |
| 2. Butanol | 17.8 |
| 3. 1-Hydroxycyclohexyl phenyl ketone | 23.7 |
| 4. Hindered amine light stabilizer | 5.9 |
| 5. Benzotriazole | 2.4 |
| 6. Antioxidant | 2.4 |
| 7. Acrylated aliphatic urethane* | 320.5 |
| 8. 1,6 Hexanediol diacrylate | 43.2 |
| 9. "BYK 301" flow improver | 3.6 |

*"EBECRYL 8301", based on polymer of alkyl carbomonocycle diisocyanate with alkanepolyol polyacrylate with an acrylated polyol.

EXAMPLE 2

Production of Topcoated Plastic Molded Article

The above-described Topcoat A was applied to polycarbonate resin lenses by spray to allow 23 microns of cured coating thickness. Thereafter, the material was irradiated with a high pressure mercury lamp of 120 W/cm$^2$, with the substrate positioned eight inches from the light source for an exposure of 3000 mJ/cm$^2$ in air.

The thus obtained topcoated polycarbonate resin lens had a clear appearance. The product was evaluated by exterior decorative standards, and superior results were obtained as set forth in Table 1.

TABLE 1

| Evaluated Item | Evaluated Method | Results |
|---|---|---|
| Scratch Resistance | 0000 Steel Wool Rubs | Passable |
| Adhesion | Peel Test ASTM | No loss |
| Abrasion Resistance | Taber Abrader, CS-10, 500 g load, 300 cycles | Passable |
| Water Resistance | 32 degrees Centigrade, 240 hour immersion | Passable, 2ndary adhesion OK |
| Thermal Shock Resist. | 4 hrs. water immersion 4 hrs. −29° C. Steam blast on scribe | Passable |
| Heat Resistance | 120° C., 2 hrs. | No cracks |
| Resistance to Water & Soap Spotting | Discoloration | Passable |
| Resist. to Acid Spots | No dulling/color change | Passable |
| Chemical Resistance | Motor Oil, Tar remover Windshield Wiper Fluid Antifreeze, Motol Fuel | Passable |
| Weather Resistance | EMMA (QUE) 925 kJ, 3.5 years equivalence | Passable |

EXAMPLE 3

Comparative Coating Material

A comparative topcoat was prepared in the same manner as in Topcoat A in Example 1, except the acrylated aliphatic urethane was replaced with one of a molecular weight of 2279. The resulting material was designated "Topcoat B".

EXAMPLE 4

Comparative Coated Article

Topcoat B was applied and cured as was Topcoat A in Example 2. The resultant coated article was evaluated by the same conditions as in Example 2, and the results set forth in Table 2 were obtained:

TABLE 2

| Evaluated Item | Results of Evaluation |
|---|---|
| Scratch Resistance | Noticeable Scratches |
| Adhesion | No loss |
| Abrasion Resistance | Unacceptable |
| Water Resistance | Passable Secondary adhesion OK |
| Thermal Shock Resistance | Passable |
| Heat Resistance | Unacceptable |
| Resistance to Water & Soap Spotting | Passable |
| Resistance to Acid Spotting | Passable |
| Chemical Resistance | Passable |
| Weather Resistance | Passable |

It was thus demonstrated that coating Compositions including acrylated aliphatic urethanes with molecular weights above about 2000 provide less desirable coatings.

What is claimed is:

1. A method for forming an exterior durable scratch resistant clear coating on a plastic lens, comprising the steps of:

(a) applying to a plastic lens an ultraviolet curable coating composition including:
   an inert organic solvent;
   exclusive of said inert organic solvent, about 5% to about 90% by weight of an acrylated aliphatic urethane having a number average molecular weight of between about 500 and 2000 and comprising an aliphatic urethane based on a polymer of alkyl carbomonocyclic diisocyanate with alkanepolyol polyacrylate;

exclusive of said inert organic solvent, about 5% to about 30% by weight of a second multifunctional acrylate having a molecular weight of about 170 to 1000 and containing at least two polymerizable acrylate groups per molecule;

a photopolymerization initiator or sensitizer; and, a light stabilizer; and (b) irradiating the applied composition with ultraviolet light and thereby curing the applied composition so as to form a clear, exterior durable, scratch resistant coating on the plastic lens.

2. A method according to claim 1 wherein said ultraviolet curable composition further comprises, a hindered amine and a benzotriazole light stabilizer.

3. A method according to claim 2 wherein said ultraviolet curable composition further comprises an antioxidant.

4. A method according to claim 3 wherein:

exclusive of said solvent, said curable composition is comprised about 50% to about 90% by weight of said acrylated aliphatic urethane, and about 10% to about 20% by weight of said second multifunctional acrylate.

5. A method according to claim 4, wherein said acrylated aliphatic urethane has a number average molecular weight of about 800 to about 1000.

* * * * *